US011288663B1

(12) United States Patent
Manuel

(10) Patent No.: US 11,288,663 B1
(45) Date of Patent: Mar. 29, 2022

(54) BLOCKRING SERVICE, SYSTEM, AND METHOD THEREOF

(71) Applicant: Arri E. Manuel, Washington, DC (US)

(72) Inventor: Arri E. Manuel, Washington, DC (US)

( * ) Notice: Subject to any disclaimer, the term of this patent is extended or adjusted under 35 U.S.C. 154(b) by 0 days.

(21) Appl. No.: 17/359,093

(22) Filed: Jun. 25, 2021

(51) Int. Cl.
G06F 21/64 (2013.01)
H04L 9/28 (2006.01)
G06Q 20/38 (2012.01)
G06Q 20/06 (2012.01)
H04L 9/06 (2006.01)
H04L 9/08 (2006.01)
G06F 21/71 (2013.01)

(52) U.S. Cl.
CPC ... *G06Q 20/38215* (2013.01); *G06Q 20/0658* (2013.01); *G06Q 20/3827* (2013.01); *H04L 9/0643* (2013.01); *H04L 9/0869* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| 7,546,461 | B2 | 6/2009 | Yuval et al. |
| 7,827,223 | B2 | 11/2010 | Gressel et al. |
| 8,914,641 | B2 | 12/2014 | Gopal et al. |
| 11,113,241 | B1* | 9/2021 | Winarski ............ G06F 3/04817 |
| 2018/0343111 | A1* | 11/2018 | Chen ..................... H04L 67/10 |
| 2019/0102782 | A1* | 4/2019 | Diehl ..................... G06F 21/16 |
| 2019/0318399 | A1 | 10/2019 | Davis et al. |
| 2020/0044854 | A1* | 2/2020 | Hsueh ................... H04L 9/3236 |
| 2020/0082126 | A1 | 3/2020 | Brown et al. |
| 2020/0099521 | A1 | 3/2020 | McDonald-Maier et al. |
| 2020/0351116 | A1* | 11/2020 | Jetzfellner ............ G06F 21/62 |
| 2020/0382310 | A1* | 12/2020 | Jayachandran ....... H04L 9/3247 |
| 2020/0412544 | A1 | 12/2020 | Kheterpal et al. |
| 2021/0081402 | A1* | 3/2021 | Krishnan ............ G06F 16/2379 |
| 2021/0081938 | A1* | 3/2021 | Falk ..................... H04L 9/3236 |
| 2021/0312543 | A1* | 10/2021 | Leise ................... G06Q 40/025 |

FOREIGN PATENT DOCUMENTS

| CN | 110968554 A | 4/2020 |
| EP | 3687107 A1 | 7/2020 |
| JP | 2005529364 A | 9/2005 |
| WO | 2003104969 A3 | 12/2003 |
| WO | 2017148245 A1 | 9/2017 |

(Continued)

OTHER PUBLICATIONS

CN110752911. English Translation. (Year: 2020).*

(Continued)

*Primary Examiner* — Venkat Perungavoor
(74) *Attorney, Agent, or Firm* — Gibraltar Consulting LLC; Tariq S. Najee-ullah

(57) ABSTRACT

A blockring service system may include a processor and memory, wherein the processor is configured to: receive a blockring request from the at least one user node; parse the request to derive blockring parameters; generate a blockring having a plurality of blocks connected by bonds based on the blockring parameters; and send the blockring to the at least one user node for distribution.

19 Claims, 10 Drawing Sheets

(56) References Cited

FOREIGN PATENT DOCUMENTS

WO      WO-2018103850 A1 * 6/2018 ........... H04L 9/0637

OTHER PUBLICATIONS

CN201910254720. English Translation. (Year: 2021).*
A decentralized lightweight blockchain-based authentication mechanism for IoT systems. Khalid. Springer, (Year: 2020).*
Blockchain-Based Lightweight Trust Management in Mobile Ad-Hoc Networks. Lwin. Sensors. (Year: 2020).*
An efficient Lightweight integrated Blockchain (ELIB) model for IoT security and privacy. Mohanty. Elsevier. (Year: 2020).*
Sensor-Chain: A Lightweight Scalable Blockchain Framework for Internet of Things. Shahid. IEEE. (Year: 2019).*
Towards Secure Network Computing Services for Lightweight Clients Using Blockchain. Xu. Wiley. (Year: 2018).*
BloTHR: Electronic Health Record Servicing Scheme in IoT-Blockchain Ecosystem. Ray. IEEE. (Year: 2021).*
Blockchain of Finite-Lifetime Blocks With Applications to Edge-Based IoT. Pyoung. IEEE. (Year: 2020).*
Homomorphic Mini-blockchain Scheme. Franca. (Year: 2015).*
Window Based BFT Blockchain Consensus. Jalazai. IEEE. (Year: 2018).*
A Distributed Credit Transfer Educational Framework based on Blockchain. Srivastava. IEEE. (Year: 2018).*
The Bitfury Group article titled "Bitfury Crystal, Use Case, Blockchain Companies Demonstracte Purity of BTC Funds," crystalblockchain.com (11 pages).

* cited by examiner

Issuance, Transmittance, and Verification 400

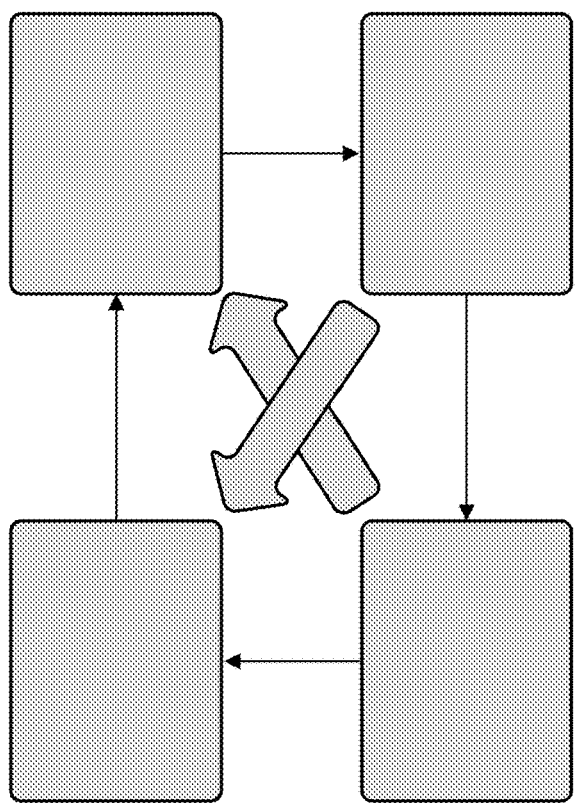
Advanced Case
Order = 1.5
2 Blocks in the Blockring have an extra hash to create more "bonds"
FIG. 8A
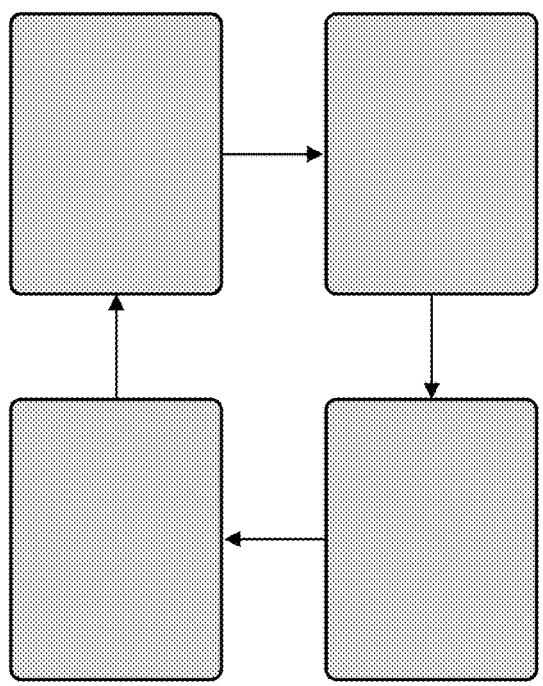
Simple Case
Order = 1

BLOCKRING SERVICE, SYSTEM, AND METHOD THEREOF

TECHNICAL FIELD

This present disclosure generally relates to an encryption system, and more particularly, to provisioning of a blockring for data security.

BACKGROUND

Use of blockchains and cryptocurrency has become quite common across different industries. The cryptocurrency or just "crypto" is a catch-all term used to refer to many different peer-to-peer electronic payments systems, the first and most popular being Bitcoin. Bitcoin, Ethereum, and Litecoin are all examples of the cryptocurrency—i.e., currency which allows transactions based on cryptographic proofs rather than relying on a trusted third party, such as a central bank. The blockchain is the underlying data structure which makes the cryptocurrency systems feasible, the main feature being the computational impracticality of changing data stored within the chain. In the application of the cryptocurrency (or other assets), the blockchain is used as a ledger which holds the history (i.e., an audible log) of all previous transactions successfully made with a certain token.

When a trusted ledger exists, a system of payments can be built upon it. The main information held within the blockchain consists of sender information, receiver information, and the order in which transactions were executed. While the cryptocurrency is a powerful system, it is enabled only by the combination of the blockchain's intrinsic properties and the decentralized nature of the platform. However, a blockchain may be too expensive and may take up too many resources to use for storing user data that is not related to cryptocurrency or other types of assets. Furthermore, if user data stored on the blockchain, the user has no option to select a strength level of the encryption since it is dictated by the size of the blockchain which in many cases may be excessive and costly for the type of data being stored.

Accordingly, a system and method that allow to create an encryption system that uses the chain-based data structure as a building block for a blockring that is also immutable and fast to validate, yet does not require a large amount of computational resources for protecting user data are desired.

BRIEF OVERVIEW

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are explanatory only and are not restrictive of the disclosure, as claimed.

In at least one instance, an embodiment of the blockring provides a processor and memory, wherein the processor is configured to receive a blockring request from the at least one user node; parse the request to derive blockring parameters; generate a blockring comprising a plurality of blocks connected by bonds based on the blockring parameters; and send the blockring to the at least one user node for distribution.

In at least another instance, an embodiment of a blockring service provides a method that includes one or more of receiving a blockring request from the at least one user node; parsing the request to derive blockring parameters; generating a blockring comprising a plurality of blocks connected by bonds based on the blockring parameters; and sending the blockring to the at least one user node for distribution.

In at least one further instance, an embodiment of a blockring service provides a non-transitory computer readable medium comprising instructions, that when read by a processor, cause the processor to perform one or more of receive a blockring request from the at least one user node; parse the request to derive blockring parameters; generate a blockring comprising a plurality of blocks connected by bonds based on the blockring parameters; and send the blockring to the at least one user node for distribution.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIGS. 8A and 8B illustrate examples of blockrings of different orders.

DETAILED DESCRIPTION

Figure 1:
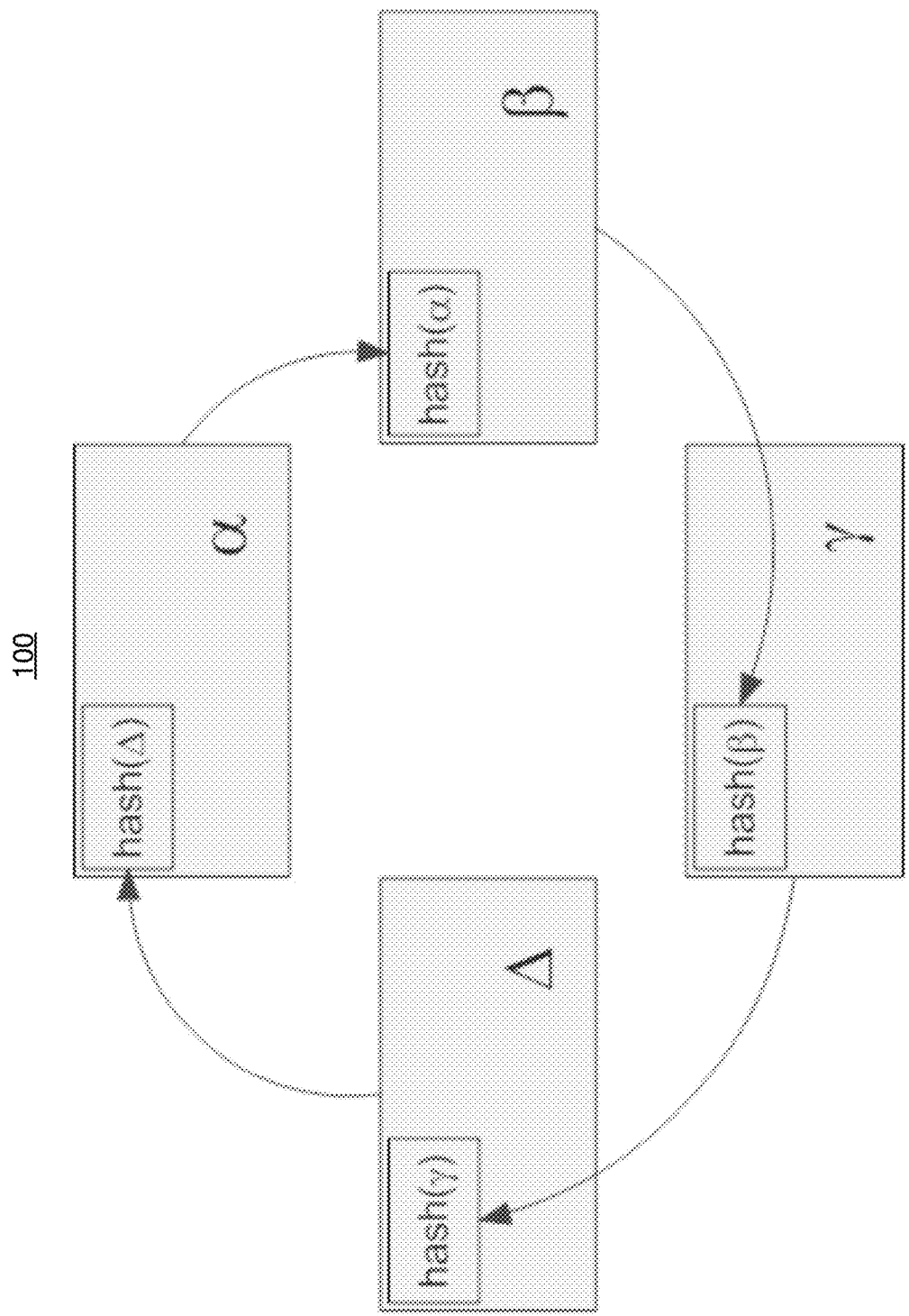
FIG. 1 illustrates a blockring structure, according to one or more embodiments.

The present disclosure includes many aspects and features. Moreover, while many aspects and features relate to, and are described in, the context of to an encryption system, and more particularly, to provisioning of a blockring for data security, embodiments of the present disclosure are not limited to use only in this context. The present disclosure can be understood more readily by reference to the following detailed description of the disclosure and the Examples included therein.

Before the present articles, systems, apparatuses, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed apparatuses, systems, and articles of the disclosure as well as the apparatuses themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and apparatuses of the disclosure. Thus, if there are a variety of additional steps that can be performed it is understood that each of these additional steps can be performed with any specific aspect or combination of aspects of the methods of the disclosure.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in one or more embodiments they are not limited to a certain type of message, and the application is not limited to a certain type of signaling.

The one or more embodiments provide methods, systems, components, non-transitory computer readable media, devices, and/or networks, which provide for generation and provisioning of a blockring to users for secure storage of data.

The one or more embodiments may use a blockchain structure for improved storage and security of user data using blockrings. The one or more embodiments may solve the issues of time and trust by extending features of a database such as immutability, digital signatures and being a single source of truth. The one or more embodiments provide a solution for a secure storage of data that requires a lesser amount of resources than a blockchain.

One of the benefits of the one or more embodiment embodiments is that it improves the functionality of a computing system/server by implementing a method for provisioning of provisioning of a blockring to users for secure storage of data.

Accordingly, the one or more embodiments provide for a specific solution to a problem in the field of provisioning data encryption and storage. According to the one or more embodiments, a method, system and a computer readable medium for provisioning of blockrings are provided. The one or more embodiments may, advantageously, allow ledger user to store data inside the blockchain blocks without having to join the blockchain.

The solution described herein allows for altering the blockchain data structure by storing the last block's hash in the origin block allowing for creation of a new data structure, the blockring. Key properties of the blockring are being computationally difficult to create, immutable once mined, and fast to validate. The blockring data structure may have limited application in cryptocurrency, but is an efficient solution for general data integrity issues in a variety of spaces.

In one embodiment, CPU power may be translated into the strength of the blockring. As such, an organization with a large amount of resources at its disposal would be able to exclude a large population of other CPUs from recreating their blockring by appropriately setting its parameters. An attacker who wishes to alter a finished blockring and pass it off as valid will be sent into an infinite loop of editing stored hashes due to the closed nature of the chain. Data written into a blockring therefore maintains a high value of trust, stored within the structure itself via the CPU cycles expended to create it.

A blockchain is a digital data structure, like an array, stack, or tree. It is made of an infinitely growing list of blocks, which are the discrete units of data that reside in the chain. In cryptocurrency, each block holds a set of confirmed transactions; further applications of the blockchain may hold other types of sensitive data inside each block, like personal medical history. Blocks are added to the end of the chain by calculating the previous block's hash value and storing that hash value in the latest block. The first block, or origin block, is a special unit because it does not have a previous hash stored within its data. By adding more and more blocks to the growing list, each holding a previous hash, the blockchain gains its intrinsic property of being computationally difficult to alter. This occurs because changing just 1 bit in an arbitrary Nth-block in the list means that the previous hash (prevHash) needs to be recalculated in the (N+1)th-block, as it will no longer match due to data changing in the Nth-block. This leads to the (N+2)th-block's prevHash needing to be recalculated for the same reason, and the situation repeats for all subsequent blocks. The blockchain gets stronger as more blocks are added to the end of the chain, because the computational power required for altering a block increases with each added block.

In the application of cryptocurrency or other voluble assets, the strength of the chain is further increased by using a proof-of-work system to chain the blocks together, rather than a simple hash function. A blockchain one billion blocks long would still be feasible to alter by one CPU if blocks were chained only by a simple SHA-256 hash. The proof-of-work system increases the required computational power by introducing a CPU-intensive cryptographic math problem that must be solved for a chain link to be valid. This increases the difficulty by magnitudes over using a simple hash, and continues to be a widely-used solution for creating cryptographically strong blockchain structures. As discussed above, this kind of a large structure may not be needed for storing data.

The introduction of the blockring data structure, according to the one or more embodiments, is not a solution to any vulnerability the blockchain has, but is a new application of the blockchain's intrinsic chaining property defined above. According to the one or more embodiments, the chaining property is mimicked from the blockchain with respect to the fact that each block stores the hash of the previous block inside of its payload. The key difference of the blockring is the state of the structure. The blockchain is an open structure that has a special origin (i.e., genesis) block with no prevHash stored in the block, and blocks are added to the end of the chain ad infinitum. Additionally, the value prevHash is calculated at the time of block addition.

The one or more blockring is a closed structure, with a set number of blocks held within the ring. Each block inside the ring still holds the hash value of the previous block but, to complete the ring, the first block now holds the hash of the final block in the list. This creates a complete and closed list of chained blocks, where each holds a valid hash of the block before it. This is best visualized as a ring structure depicted in FIG. 1.

FIG. 1 illustrates a blockring structure, according to one or more embodiments of the present disclosure.

Referring to FIG. 1, a valid blockring 100 is introduced. In at least one instance, the blockring includes four blocks. If 1-bit is changed in an arbitrary Nth-block in the list, the (N+1)th-block's prevHash will then not match, leading to an invalid blockring. Furthermore, if the invalid prevHash is changed to match the Nth-block's hash, the same problem will occur in the (N+2)th-block. The difference from the blockchain is that it is not simply a case of recalculating all subsequent blocks in the list. The editor (i.e., a potential intruder) will be stuck in an infinite loop of recalculating prevHashes and ultimately fail because of the closed ring structure. This feature of the valid blockring is a key property of the proposed data structure.

As discussed above, the blockring structure 100 is proposed mainly as a solution to data integrity issues. The properties of the blockring can be summarized as being: CPU-intensive and difficult to create, unalterable once created, and fast to validate. The creator of the blockring holds the power to decide how strong the ring is, and therefore how difficult it is to recreate. Choosing an appropriate prevHash function, increasing the number of blocks in the ring, and implementing further difficulty via a proof-of-work system are different ways to increase a blockring's strength.

In at least one instance, a creator of the blockring may take an arbitrary file and may lock the file into the blockring. The creator may set parameters of the blockring based on desired strength. The strength of a valid blockring may be a function of the CPU power. For example, an organization with a large amount of CPU power can create immutable blockrings that cannot be easily reproduced due to the amount of resources needed to do so. The trusted blockring can subsequently be distributed to a third party and validated. The blockrings are, advantageously, simple and are fast to validate no matter the strength of the blockring. An arbitrary N-length blockring would require one traversal and N prevHashes to be calculated by the final recipient for successful verification. This is a routine task that is feasible for a single modern CPU to run in a reasonable amount of time, even for the blockrings that are millions of blocks long that use a strong hash function such as SHA-256. Third party recipients also have the option of writing their own trusted validator code for extra security, as it is simple to understand the method of verification. These key properties of the blockring allow real world applications of the example blockring structure 100.

According to the one or more embodiments, one data integrity issue that can be addressed by the use of the blockring is the execution of trusted software code. A software development organization may choose to release its program locked into a powerful blockring. The first benefit is that the act of validation proves the executable was created by a central organization with a large amount of CPU power. This deters a large subset of bad actors from spreading a counterfeit program which may include malicious code. Additionally, the code distributed as a valid blockring would have protection throughout its full lifecycle, because the blockring structure provides defense against other rogue code changing data or instructions contained within the program. A simple validation-before-use routine provides protection from a virus altering code that has been previously trusted. In case of operating system and/or driver code provided within the blockring can protect against an attacker gaining root or privileged access to the system. Hardware validation can be implemented to provide extra security in these cases.

Another example may be data integrity issues related to personal identification. An enterprise organization may opt to employ a blockring writing service to create unique identification data or personal keys linked to an individual. Using sufficient CPU power, it would not be computationally feasible for a bad actor to counterfeit the unique blocking. Combined with storing image or fingerprint data inside the blocking, this provides security against other cases of fraud due to the immutable property of the blockring structure. Other types of public-facing data like web certificates may be stored as blockrings to improve the general security of the Internet and to decrease the need for complex certificate authority systems, as the proof of creation is intrinsic to the data structure itself.

Figure 2:
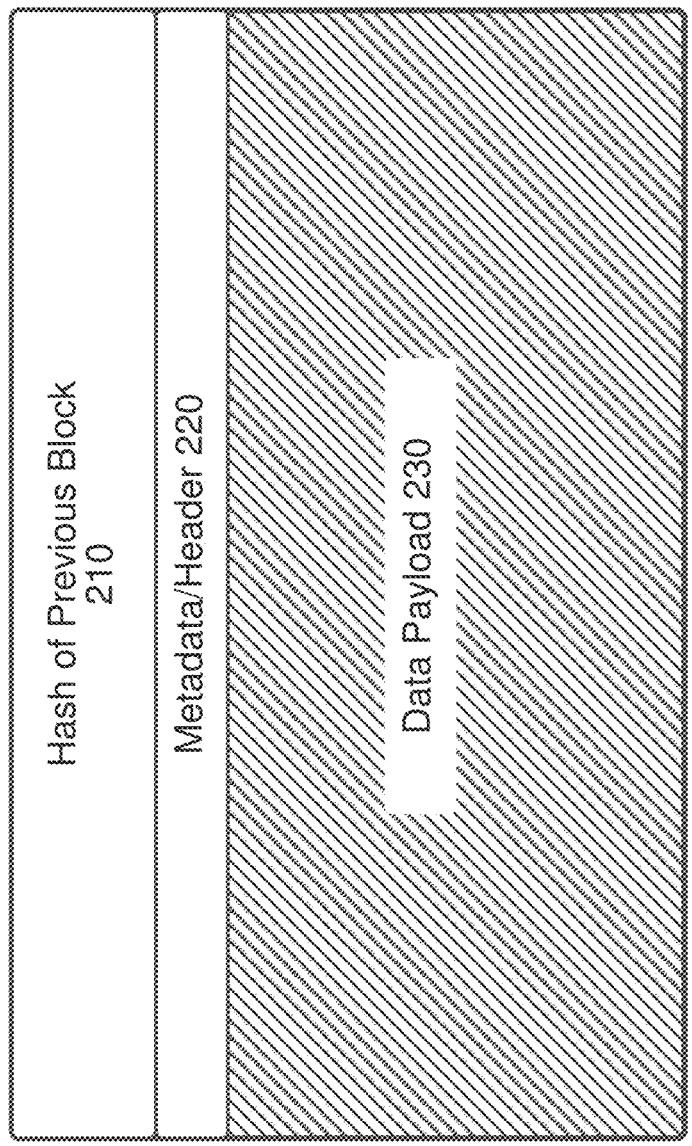
FIG. 2 illustrates an example structure of a block of a blockring, according to the one or more embodiments.

FIG. 2 illustrates an example structure of a block of a blockring, according to the one or more embodiments. This diagram shows the general structure 200 of each block in a blockring. The most important part of the block is the block hash 210, as this is used to verify the blockring. Otherwise, the metadata/header 220 is a preference of the issuer and does not need a specific structure. The data payload 230 is arbitrary length data that is usually split into equal sizes (but that is not required). The entire block 200 will be hashed to be compared against the next block's stored hash.

Figures 3A, 3B:
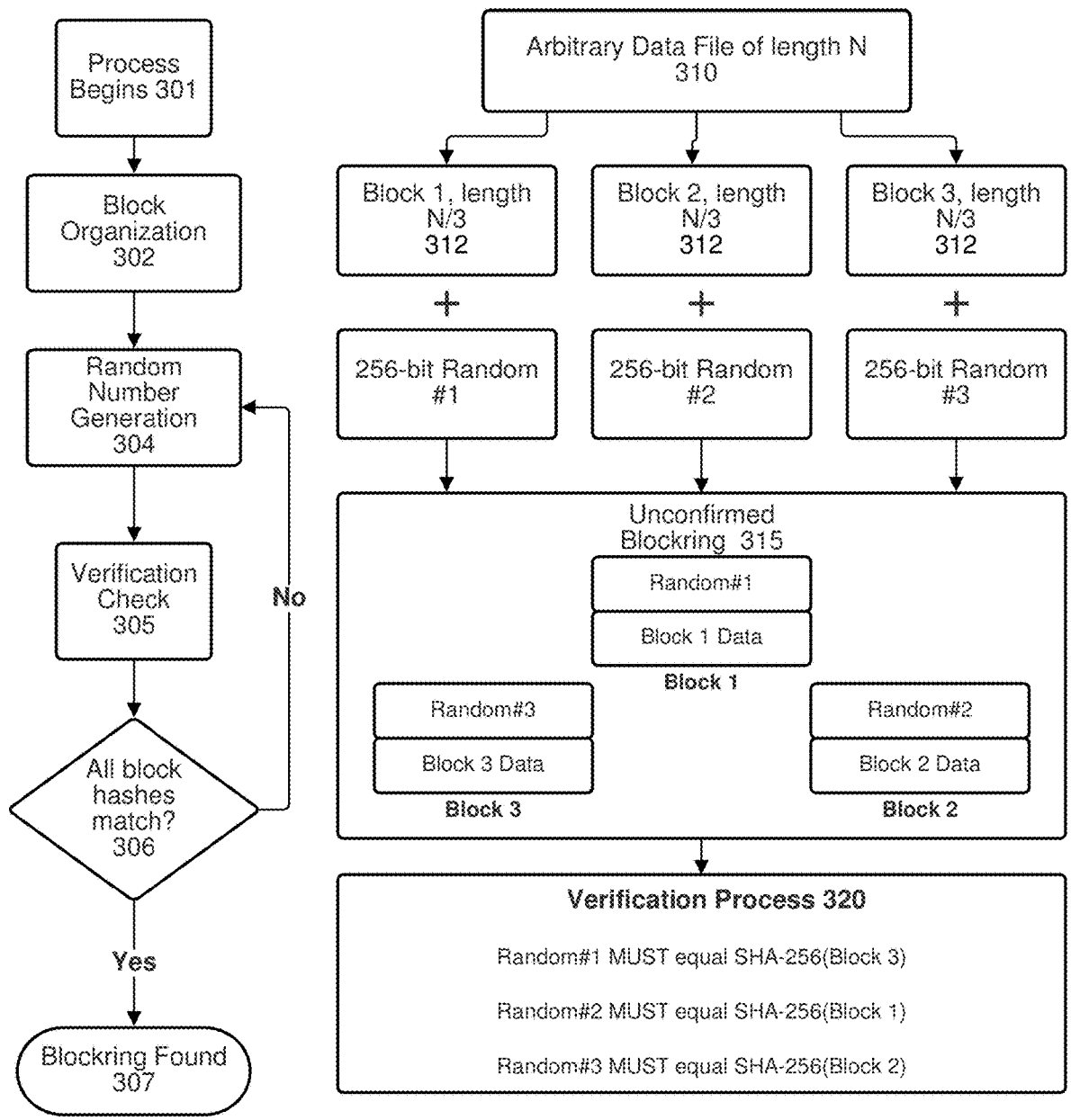
FIGS. 3A and 3B illustrate example flows of blockring writer algorithm, according to the one or more embodiments.

FIGS. 3A and 3B illustrate example flows of blockring writer algorithm, according to the one or more embodiments.

The diagrams depicted in FIGS. 3A and 3B show the most basic blockring mining algorithm. On the left-hand side (FIG. 3A) is a description of the overall process, with tech details on the right side (FIG. 3B). In FIG. 3A, first the arbitrary data is split into blocks and organized into an unconfirmed blockring by generating random numbers and placing them arbitrarily into blocks. At block 301 the blockring mining process begins. Block organization is performed at block 302 by random number generation at block 304. Once the random numbers are set, the unconfirmed blockring is verified at block 305 to see if the hashes match. If the hashes do not match at block 306, the process retries with new random numbers. This is a brute-force solution that does not scale very well on purpose. The aim is to exclude a large portion of actors from making an equivalent blockring, by requiring a bunch of CPU power to create them. If the hashes match at block 306, the blockring is found at block 307.

Referring to FIG. 3B, an arbitrary data file of length N may be divided into three equal blocks 312 of the length N/3. Each of the blocks 312 is hashed using respective random numbers 1, 2 and 3. Thus, an unconfirmed blockring 315 is produced. Then verification process 320 is performed as described with respect to block 306 in FIG. 3A.

Figure 4:
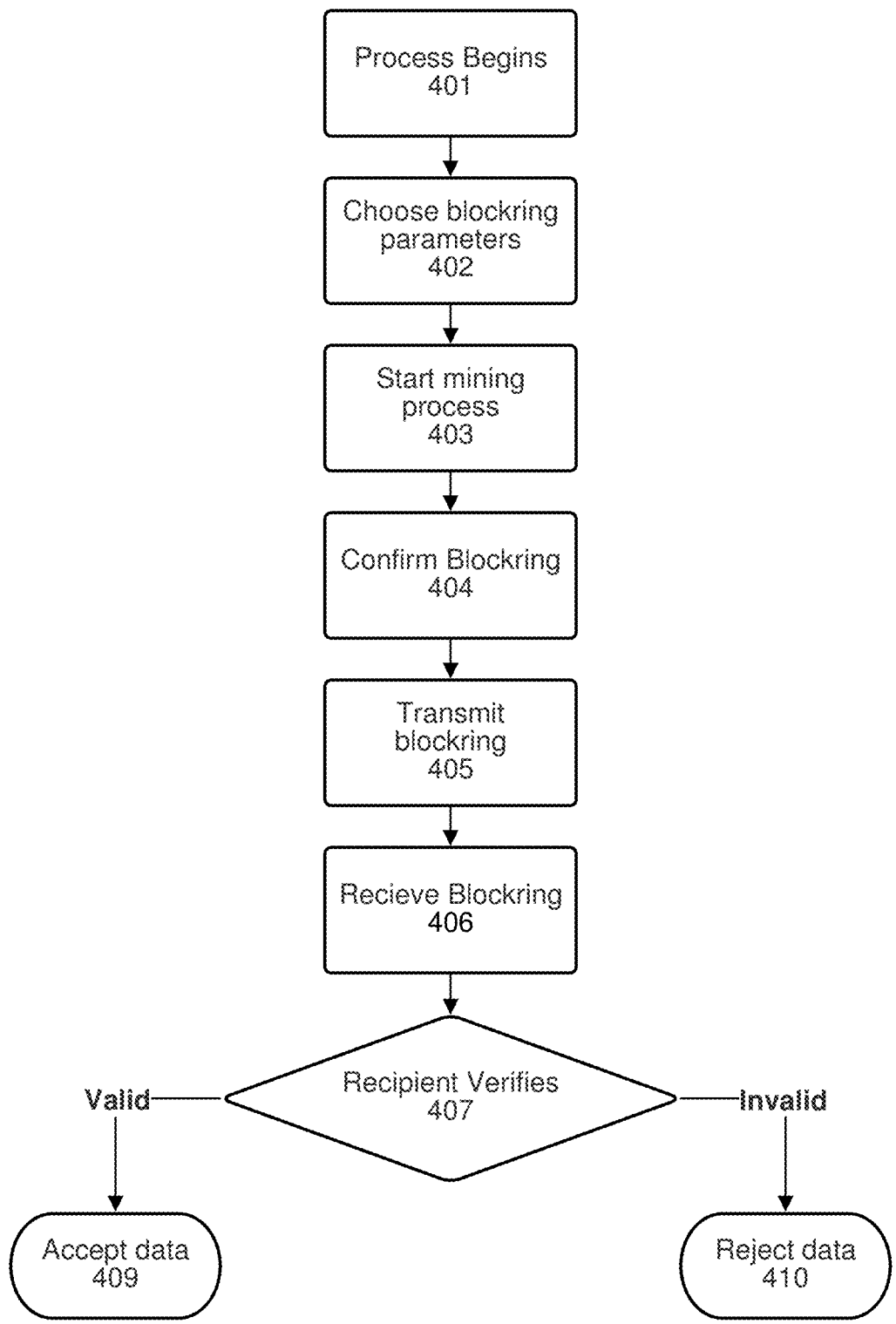
FIG. 4 illustrates a workflow of issuance, transmission and verification of a blockring, according to the one or more embodiments.

FIG. 4 illustrates a workflow of issuance, transmission and verification of a blockring, according to the one or more embodiments.

Referring to FIG. 4, this example illustrates the most common pattern of use. Once the blockring mining process is completed, the resulting blockring may be distributed in any manner that the writer wishes (e.g., P2P, blockchain, normal HTTP web, etc.). Once the recipient receives the completed blockring, he may do a quick verify-before-use routine to test its validity. A major feature of this system is that it is expensive to mine, but very cheap to verify by any number of end users. All it requires is one loop of the data. Distribution of software, patches, and updates over the web is a potential example of this process in action. End-users could trust that a software patch is virus-free if 99.9% of bad actors cannot even create the data structure that it is stored in. One bit changed during transmission will invalidate the entire blockring.

Additionally, public key certificates could implement this architecture. The public key certificate may be written and locked into a blockring by a large, trusted organization which then distributes them across the web. This means much less reliance on Certificate Authorities since the certificate is secure down to the data structure level.

The issuance process begins at block 401. The parameters of the blockring are selected at block 402. The mining process is started at block 403. The resulting blockring is confirmed at block 404. The blockring is transmitted to a recipient at block 405. The blockring is received at block 406 and verified by the recipient at block 407. If verification is unsuccessful (i.e., the blockring is invalid) at block 407, the data is rejected at block 410. Otherwise (i.e., the blockring is valid), the data is accepted at block 409.

Figure 5:
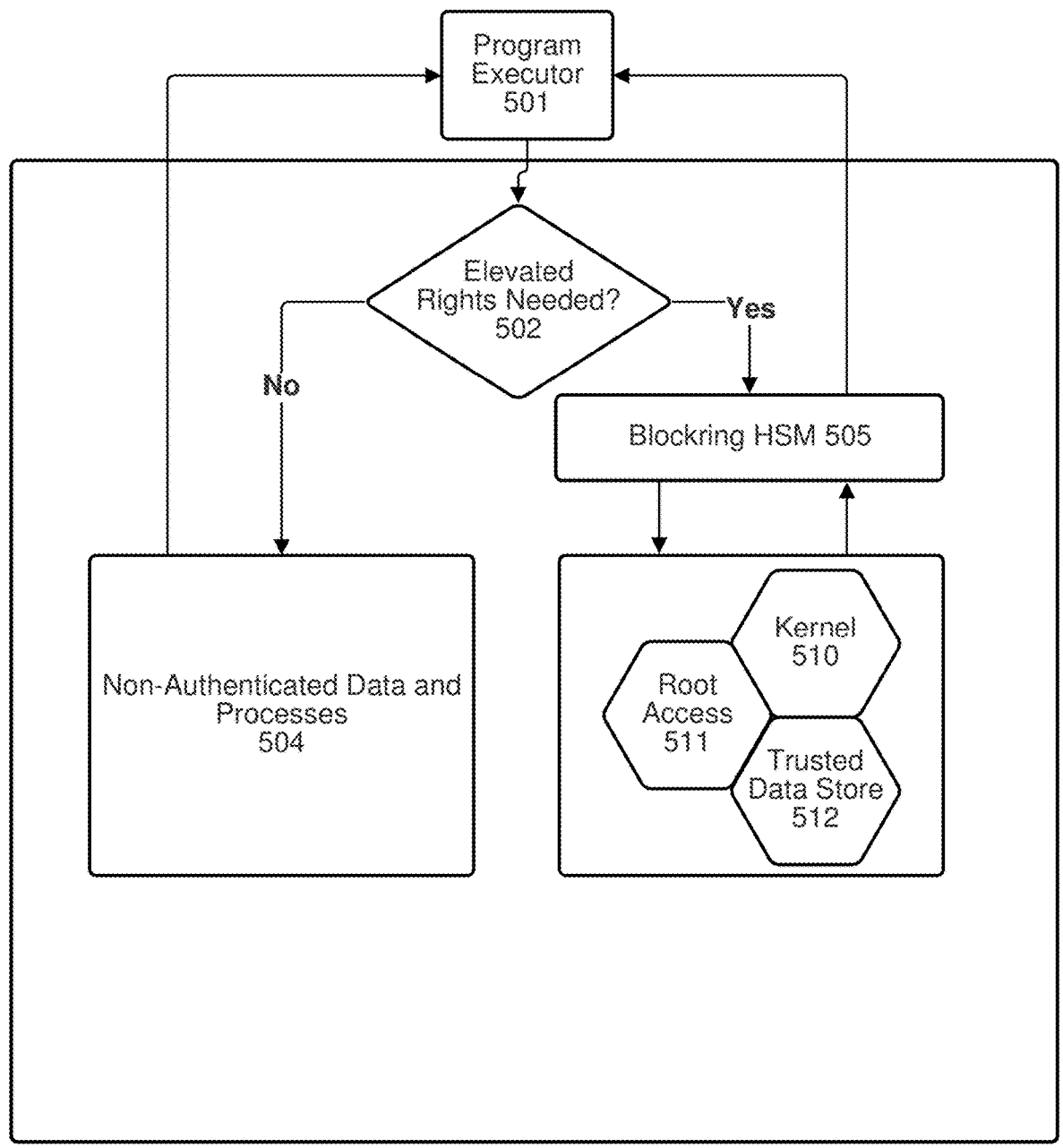
FIG. 5 illustrates and example blockring hardware security module (HSM), according to the one or more embodiments.

FIG. 5 illustrates and example blockring hardware security module (HSM) 500, according to the one or more embodiments.

Referring to FIG. 5, this is an example of an advanced, hardware level use-case for the blockring system. A special HSM or security module can be integrated into CPUs or motherboards, providing blockring protection down to the hardware level. The blockring HSM is configured to guard root access 511 and kernel level 510 processes and data, only allowing actions once the program has been verified to be a valid blockring. A program executer module 501 may determine if the elevated rights needed at block 502. If yes, the blockring HSM 505 performs the protection. Otherwise, no authenticated data and processes are 504 are separated from the root access 511 and kernel level 510 processes and from the trusted data store 512. This is a very advanced use-case that would require cooperation across software, hardware, and infrastructure technology companies.

Figure 6:
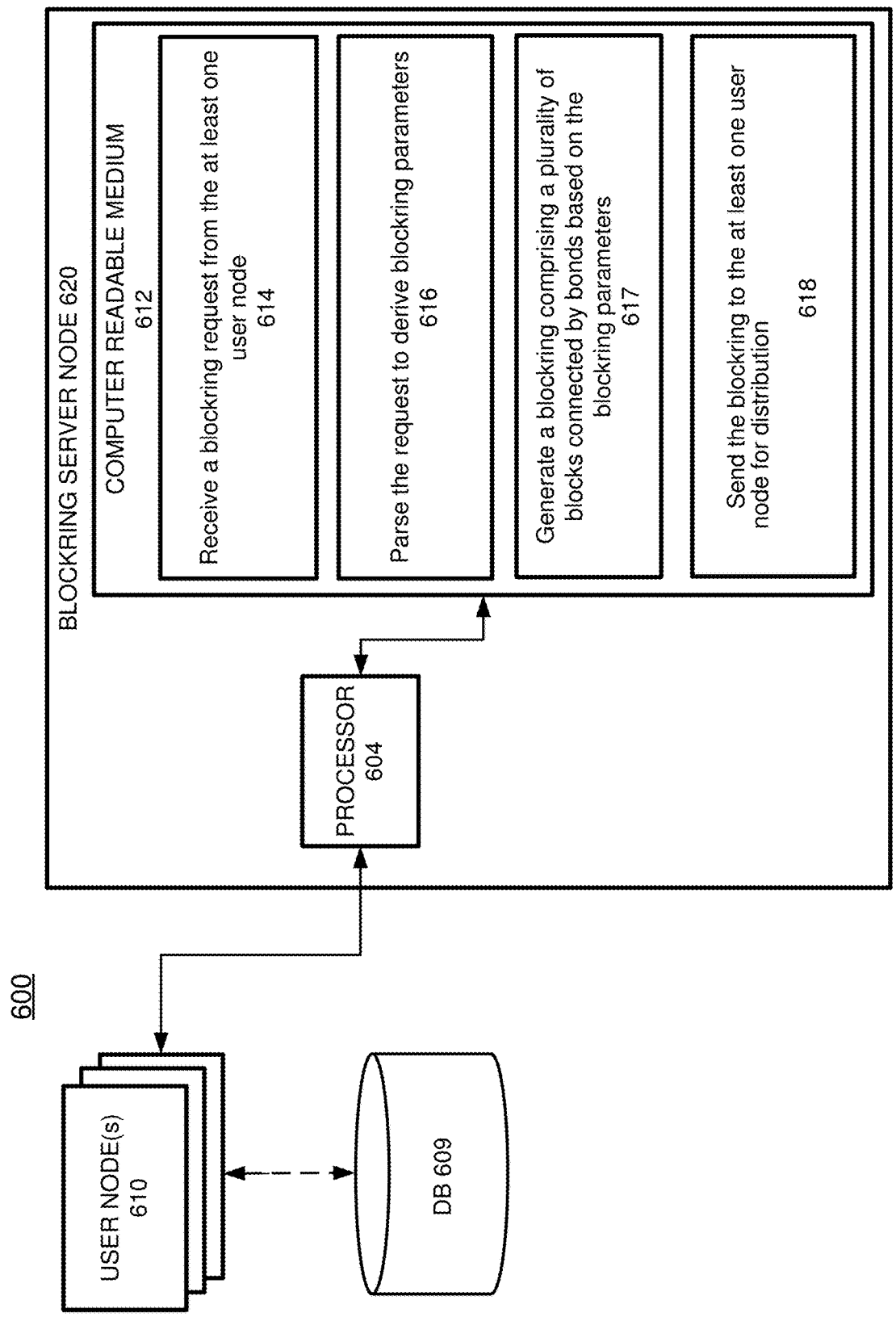
FIG. 6 illustrates implementation of a blockring-as-a-service (BRaaS), according to the one or more embodiments.

FIG. 6 illustrates blockring-as-a-service (BRaaS) network diagram, according to the one or more embodiments.

The BRaaS is an example of an enterprise level use-case that would be very attractive to corporations looking to make revenue from their CPU power. A corporate or governmental entity can use its vast amount of CPU resources to become a blockring writer. As discussed above, blockring strength is bounded by CPU power, so the role of a blockring writer (e.g., blockring server) will most likely be filled by large organizations that have access to massive CPU power.

Referring to FIG. 6, a network diagram 600 of a system including detailed features of a blockring server node representing a large organization is provided. The blockring server node 620 may be connected to user nodes 610 representing customer devices who request the BRaaS over a network. The nodes 610 may be connected to other nodes that the blockring is distributed to for protection of their data stored in the DB 609, for example. The blockring server node 620 may be a cloud server or a like. Multiple other participant nodes may be connected to the blockring server node 620.

While this example describes in detail only one blockring server node 620, multiple such nodes may be connected over the network. It should be understood that the blockring server node 620 may include additional components and that some of the components described herein may be removed and/or modified without departing from a scope of the blockring server node 620 disclosed herein. The blockring server node 620 may be a computing device or a server computer, or the like, and may include a processor 604, which may be a semiconductor-based microprocessor, a central processing unit (CPU), an application specific integrated circuit (ASIC), a field-programmable gate array (FPGA), and/or another hardware device. Although a single processor 604 is depicted, it should be understood that the blockring server node 620 may include multiple processors, multiple cores, or the like, without departing from the scope of the blockring server node 620 system.

The blockring server node 620 may also include a non-transitory computer readable medium 612 that may have stored thereon machine-readable instructions executable by the processor 604. Examples of the machine-readable instructions are shown as 614-620 and are further discussed below. Examples of the non-transitory computer readable medium 612 may include an electronic, magnetic, optical, or other physical storage device that contains or stores executable instructions. For example, the non-transitory computer readable medium 612 may be a Random-Access memory (RAM), an Electrically Erasable Programmable Read-Only Memory (EEPROM), a hard disk, an optical disc, or other type of storage device.

The processor 604 may fetch, decode, and execute the machine-readable instructions 614 to receive a blockring request from the at least one user node 610. The processor 604 may fetch, decode, and execute the machine-readable instructions 616 to parse the request to derive blockring parameters. The processor 604 may fetch, decode, and execute the machine-readable instructions 618 to generate a blockring comprising a plurality of blocks connected by bonds based on the blockring parameters. The processor 604 may fetch, decode, and execute the machine-readable instructions 620 to send the blockring to the at least one user node 610 for distribution to other nodes (not shown).

Figure 7:
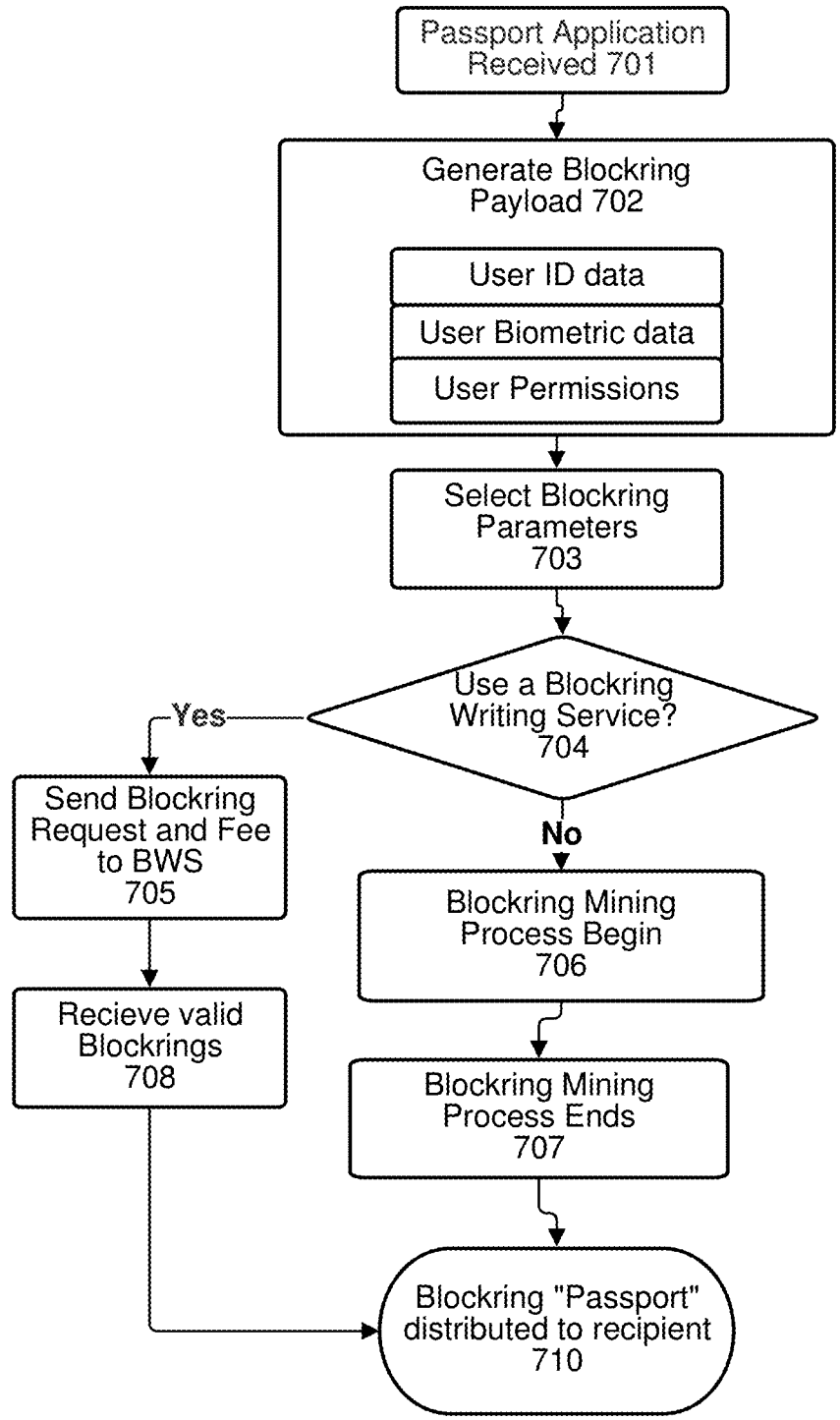
FIG. 7 illustrates an example of a centralized entity using a blockring, according to the one or more embodiments.

FIG. 7 illustrates an example of a centralized entity using a blockring, according to the one or more embodiments.

Referring to FIG. 7, this diagram 700 shows a potential real-life example of a centralized entity using blockring to secure highly sensitive data in a passport. Integrating blockring into IDs and passports may greatly decrease the possibility of forgeries. Again, a bad actor would have to have at least the same amount of CPU power as the central entity to even be able to start forging a passport. This process may include user biometric data in the blockring and may require locking user permissions directly to their fingerprint.

At block 701 a passport application is received. A blockring payload is generated at block 702. The payload may include user ID data, user biometric data and user permissions. Blockring parameters are selected at block 703. If, at block 704, use of a blockring writing service (BWS) is selected, a fee and a blockring request are sent to the BWS at block 705. Then, a valid blockring is received at block 708. Otherwise, the blockring mining process begins at block 706 and ends at block 707. A blockring "passport" is distributed to the recipient at block 710.

Figure 8B:
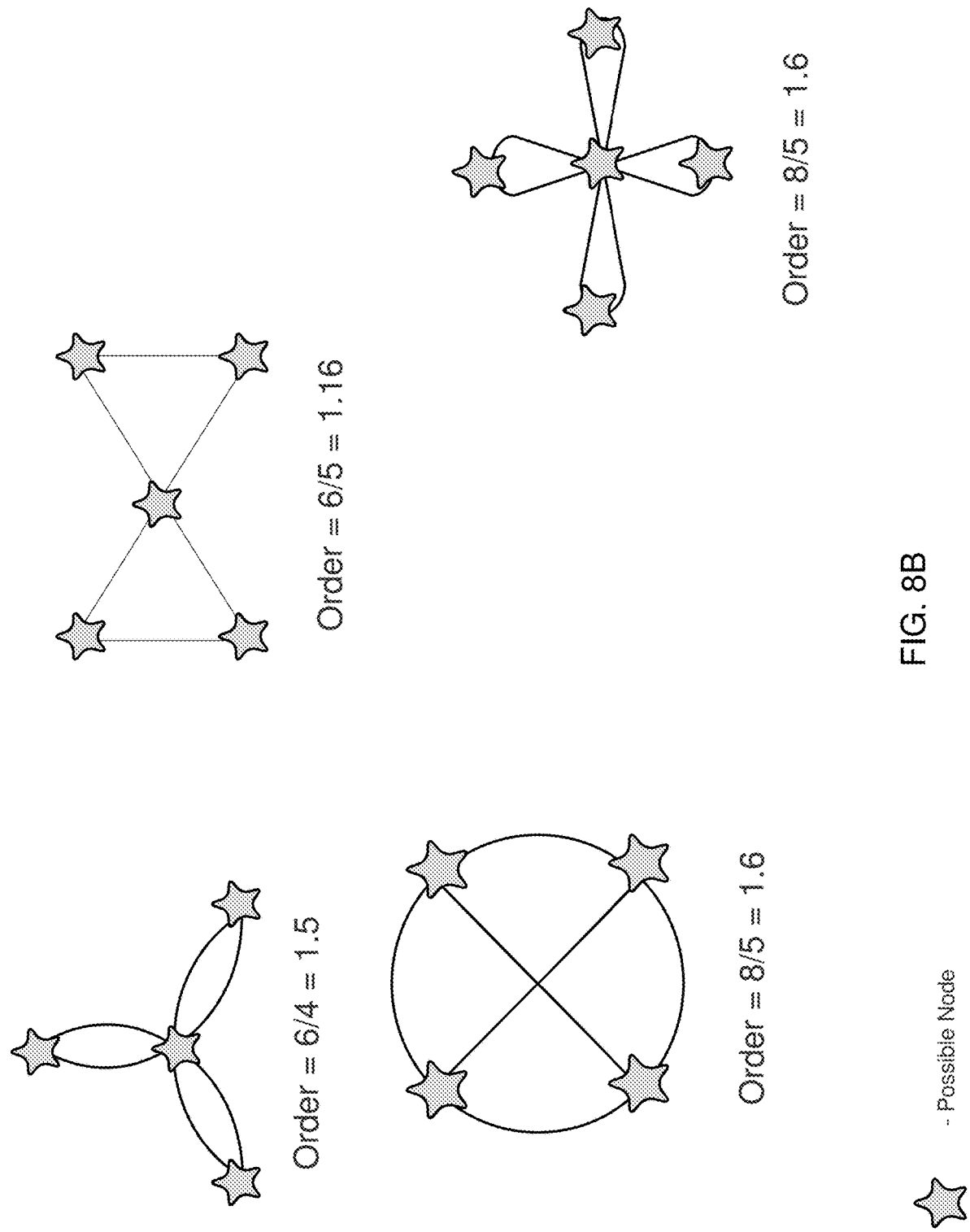

FIGS. 8A and 8B illustrate examples of blockrings of different orders.

Blockring starts at a closed 2-dimensional loop, but can grow to even higher dimensions and create higher complexities by using multiple links or "bonds" in one block as shown in FIGS. 8A and 8B.

In FIG. 8A, a simple blockring with order of 1 is depicted on the left. A blockring with order of 1.5 is depicted on the right. In this case, two blocks have an extra hash to create more "bonds."

Order=(# of "Bonds")/(# of Blocks)

Higher order means higher strength of the blockring, proportionally.

In FIG. 8B, different blockrings of higher order are shown.

Considering the differences between the creation, application, and properties of the blockring when compared to the blockchain, secondary implications arise from the introduction of the closed chain structure. Blockchain-based mining, a major aspect of digital currency systems, can be compared to a digital lottery. This means many mining-optimized CPUs and GPUs across the world are all competing to confirm the next block, and receive the reward for solving the difficult proof-of-work puzzle. Since only one miner can confirm the latest block, all of the work that the other CPUs put in for solving the puzzle is wasted when they do not win the "lottery" for the mining reward. This leads to many wasted CPU cycles per confirmation, and subsequently the energy consumed to run those cycles is also wasted. This is a major negative aspect of the cryptocurrency and blockchain-based proof-of-work mining systems. While blockring mining is still a CPU and energy intensive process, the CPU cycles are not wasted as there is no "lottery" to lose. The CPU cycles used for blockring mining are, at the very least, a measure of the strength of the resulting blockring. This means each CPU cycle has value reflected in the final valid blockring structure.

Continuing with the comparison to cryptocurrency, blockchain's main application, the blockring has a centralized-first nature of trust rather than the decentralized-first nature of the blockchain. The system of trust from a blockchain perspective comes from many anonymous nodes on the network agreeing which copy of the blockchain can be trusted, then the data stored within the trusted blockchain can be centralized, i.e., token balances assigned to a specific wallet or public key. Without decentralized agreement of which blockchain to use, the values cannot be trusted within the chain. The blockring's system of trust comes from a centralized source first. A blockring recipient will trust that the ring was sufficiently difficult to create, and will validate the ring independently to confirm the ring's trustworthiness. The trustworthiness of the ring is stored within the ring itself at creation time, rather than relying on a decentralized system to confirm this trust.

The final point of comparison to consider is the extendibility of the blockring and of the blockchain. Visually, the blockchain can be compared to a straight line, growing infinitely forward in one dimension. It may branch into two or more separate chains, but the base structure persists. The blockring is the simplest implementation of a closed blockchain, a circular list with no true end or beginning. Following this pattern, one can visualize the creation of other closed chain structures, for example a lattice or 3-dimensional cube of chained blocks a shown in FIG. 8B. These cases would be increasingly CPU intensive to create, as blocks may contain 2, 3, or more linked hashes depending on the "shape" of the structure.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

One or more storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example computer system/server node 500, which may represent or be integrated in any of the above-described components, etc.

Figure 9:
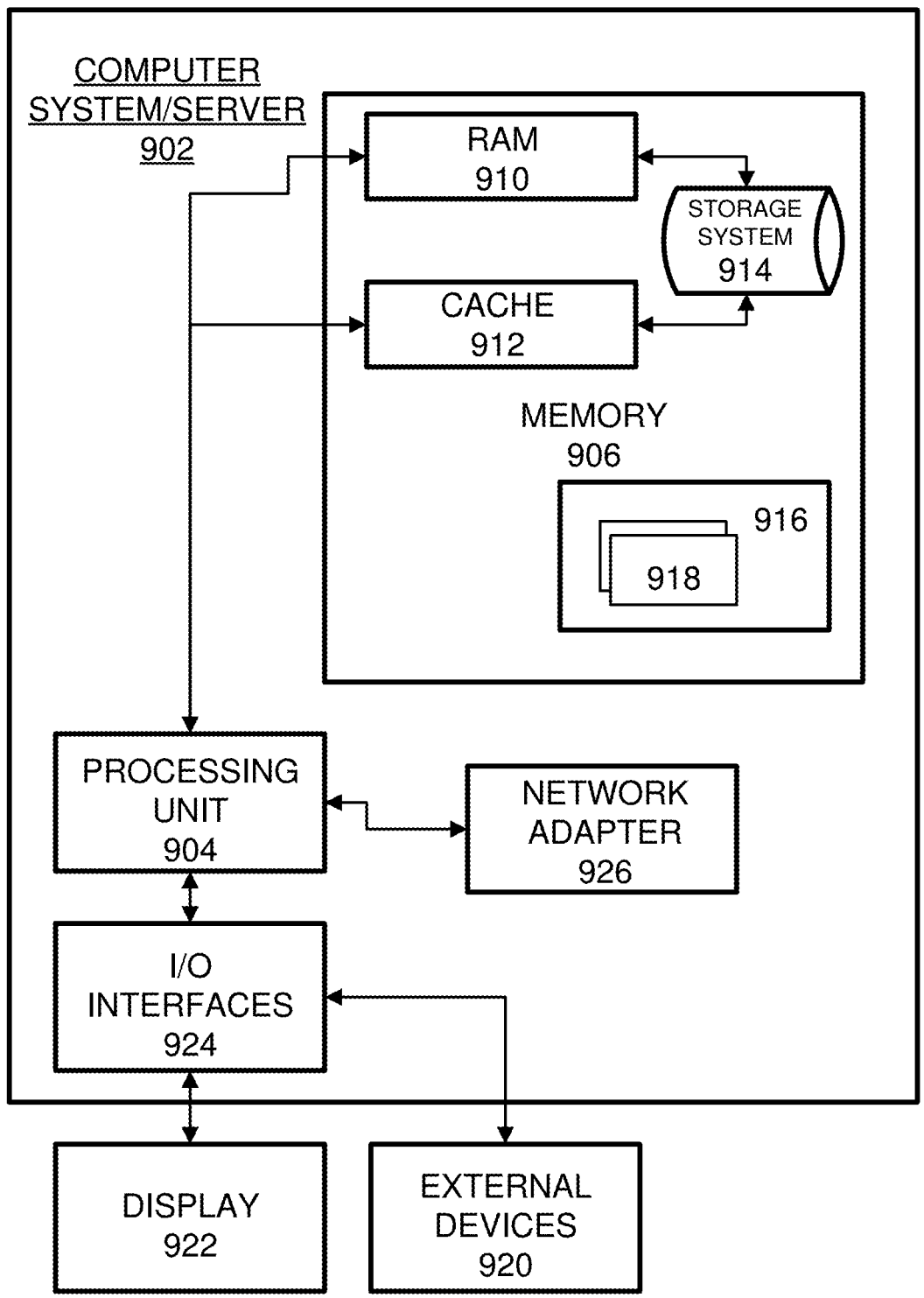
FIG. 9 illustrates an example server system that supports the one or more embodiments.

FIG. 9 is not intended to suggest any limitation as to the scope of use or functionality of embodiments of the application described herein. Regardless, the computing node 900 is capable of being implemented and/or performing any of the functionality set forth hereinabove.

In the computing node 900 there is a computer system/server 902, which is operational with numerous other general purposes or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 may be used in cloud computing node 900 shown in the form of a general-purpose computing device. The components of the computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The one or more computer system/server 902 typically includes a variety of computer system readable media. Such media may be any available media that is accessible by the computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. The computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

The computer system/server 902 may also communicate with one or more external devices 920 such as a keyboard, a pointing device, a display 922, etc.; one or more devices that enable a user to interact with computer system/server 502; and/or any devices (e.g., network card, modem, etc.) that enable computer system/server 902 to communicate with one or more other computing devices. Such communication can occur via I/O interfaces 924. Still yet, the computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

Although one or more embodiments of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, recipient or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations.

The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system, comprising:
a processor of a blockring server node connected to at least one user node over a network;
a memory on which are stored machine readable instructions that when executed by the processor, cause the processor to:
receive a blockring request from the at least one user node;
parse the request to derive blockring parameters;
generate a blockring comprising a closed ring structure of a plurality of blocks connected by bonds based on the blockring parameters;
wherein the blockring comprises a first block of the plurality of blocks having a hash of a final block of the plurality of blocks defined by the blockring parameters; and
send the blockring to the at least one user node for distribution.

2. The system of claim 1, wherein the generation of the blockring comprises generation of random numbers for each block of the plurality of the blocks.

3. The system of claim 1, wherein the instructions further cause the processor to verify the blockring by matching hashes of the plurality of the blocks.

4. The system of claim 1, wherein the blockring parameters are configured to define strength of the blockring, wherein the strength is proportional to an order of the blockring.

5. The system of claim 4, wherein the order of the blockring comprises a ratio between a number of the bonds existing between the plurality of the blocks and a number of the blocks.

6. The system of claim 1, wherein the instructions further cause the processor to create the plurality of the blocks based on the blockring parameters.

7. The system of claim 1, wherein the instructions further cause the processor to execute at least one CPU cycle to generate the blockring, wherein the at least one CPU cycle is reflected in a structure of the blockring.

8. A method, comprising:
receiving, by a blockring server node, a blockring request from the at least one user node;

parsing, by the blockring server node, the request to derive blockring parameters;

generating, by the blockring server node, a blockring comprising a closed ring structure of a plurality of blocks based on the blockring parameters;

wherein the blockring comprises a first block of the plurality of blocks having a hash of a final block of the plurality of blocks defined by the blockring parameters; and sending the blockring to the at least one user node for distribution.

9. The method of claim 8, further comprising generating a random number for each block of the plurality of the blocks.

10. The method of claim 8, further comprising verifying the blockring by matching hashes of the plurality of the blocks.

11. The method of claim 8, wherein the blockring parameters are configured to define strength of the blockring, wherein the strength is proportional to an order of the blockring.

12. The method of claim 11, wherein the order of the blockring comprises a ratio between a number of the bonds existing between the plurality of the blocks and a number of the blocks.

13. The method of claim 8, further comprising creating the plurality of the blocks based on the blockring parameters.

14. The method of claim 8, further comprising executing at least one CPU cycle to generate the blockring, wherein the at least one CPU cycle is reflected in a structure of the blockring.

15. A non-transitory computer readable medium comprising instructions, that when read by a processor, cause the processor to perform:

receiving a blockring request from the at least one user node;

parsing the request to derive blockring parameters;

generating a blockring comprising a closed ring structure of a plurality of blocks based on the blockring parameters, wherein the generating of the blockring comprises executing at least one CPU cycle that is reflected in a structure of the blockring; and sending the blockring to the at least one user node for distribution.

16. The non-transitory computer readable medium of claim 15, further comprising instructions, that when read by the processor, cause the processor to generate the blockring by generation of random numbers for each block of the plurality of the blocks.

17. The non-transitory computer readable medium of claim 15, further comprising instructions, that when read by the processor, cause the processor to verify the blockring by matching hashes of the plurality of the blocks.

18. The non-transitory computer readable medium of claim 15, wherein the blockring parameters are configured to define strength of the blockring, wherein the strength is proportional to an order of the blockring.

19. The non-transitory computer readable medium of claim 18, wherein the order of the blockring comprises a ratio between a number of the bonds existing between the plurality of the blocks and a number of the blocks.

* * * * *